United States Patent [19]

Seki

[11] 4,336,960
[45] Jun. 29, 1982

[54] SNELL COILING DEVICE

[76] Inventor: Mikio Seki, No. 683-3, Fussa, Fussa-shi, Tokyo, Japan

[21] Appl. No.: 152,579

[22] Filed: May 23, 1980

[30] Foreign Application Priority Data

Feb. 1, 1980 [JP] Japan .................. 55-10298

[51] Int. Cl.³ .................. A01K 91/06; D04G 5/00
[52] U.S. Cl. ............................ 289/17; 43/4
[58] Field of Search ............ 289/17; 43/1, 4

[56] References Cited

U.S. PATENT DOCUMENTS

| | | | |
|---|---|---|---|
| 2,145,439 | 1/1939 | Torrence | 289/17 |
| 2,734,299 | 2/1956 | Masson | 289/17 |
| 2,856,970 | 10/1958 | Benedict | 289/17 |
| 3,321,225 | 5/1967 | Miller | 289/17 |
| 3,706,466 | 12/1972 | Landry et al. | 289/17 |
| 4,029,346 | 6/1977 | Browning | 289/17 |

*Primary Examiner*—Louis Rimrodt
*Attorney, Agent, or Firm*—Michael J. Striker

[57] ABSTRACT

A device for coiling a snell about a fishing hook consists of a snell holder and a fish hook holder. The fish hook holder is formed from two plates which secure the hook as a nipper and which are rotatably mounted. The fish hook holder also is equipped with a spring loaded bolt that is raised by a lever arm and which is used to hold the snell to coil the snell. The fish hook holder also has a pin inserted through one of the plates operative for forming a loop of the snell used to securely tie off the snell upon completion of the coiling. The snell holder may be a bolt and a spring loaded flange, the snell being held between the head of the bolt and the flange.

7 Claims, 8 Drawing Figures

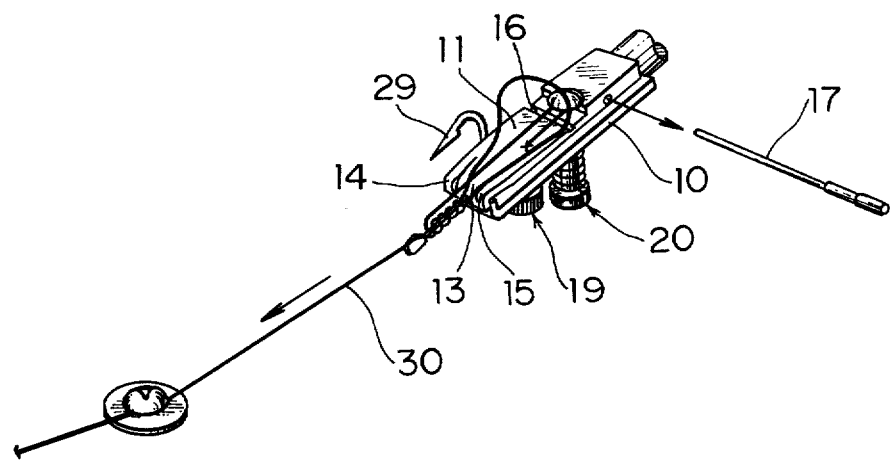
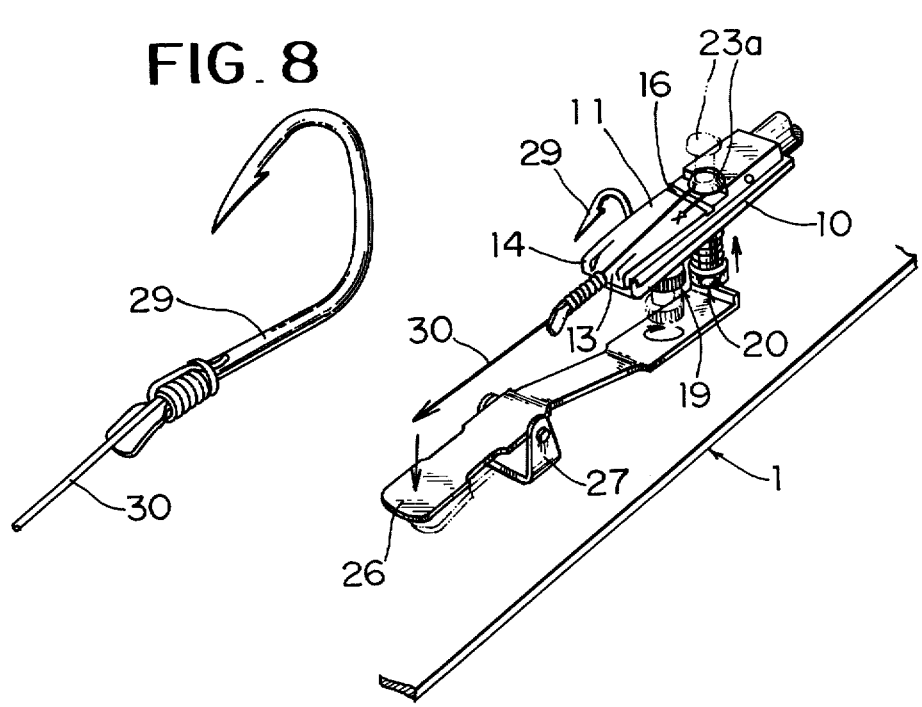

SNELL COILING DEVICE

BACKGROUND OF THE INVENTION

The invention relates to coiling devices that are used to securely coil a snell, i.e. a shorter secondary fishing line which connects the hook to the longer principal fishing line.

At the present time snells are coiled only by hand. This manual technique has several disadvantages since it requires great skill. Even with a high level of skill the manual method is disadvantageously idiosyncratic in that each coiler has a personal style of snell coiling that results in inconsistent coils from one coiler to the next.

Another disadvantage is the undependable nature of hand coiled snells with small hooks. Even the skilled often fail to properly coil a snell about snell hooks. This improper coiling causes the snell to be severed in use and permits hooks to loosen and become lost.

SUMMARY OF THE INVENTION

The invention has as an object of the removal of the existing disadvantages of snell coiling by hand.

An object of this invention is to provide a mechanical device to form the snell on the hook so that inconsistencies present in the manual process are eliminated.

Another object of the invention is provide a device for coiling snells that is both simple to construct and portable.

An additional object of the invention is to provide a snell coiler that is precise in its operation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 6 is a perspective view of the device in which the tying off of the snell is begun;

FIG. 7 is a perspective view of the device showing the last step in tying off the snell; and FIG. 8 is a perspective view of a properly coiled snell produced by the device.

DESCRIPTION OF THE PREFERRED EMBODIMENTS

Figure 1:
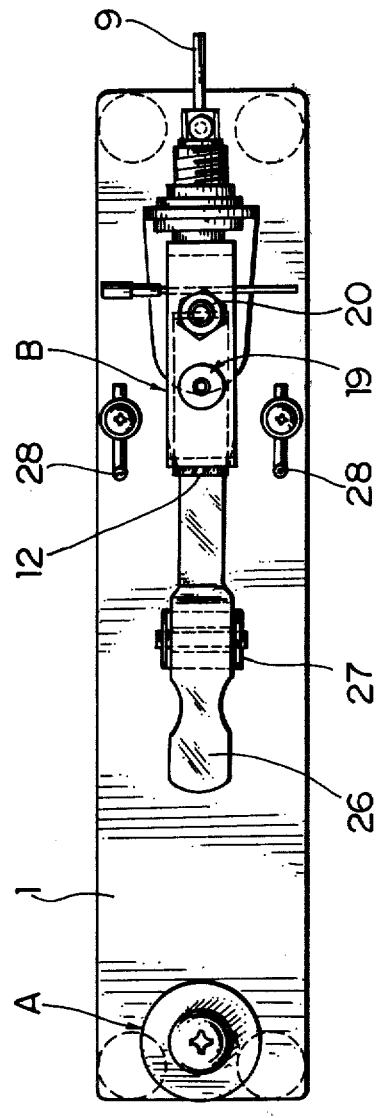
FIG. 1 is a top view of a device according to the invention.

The invention is described in reference to the drawings. As seen in FIG. 1, the device consists of a base 1 to which are attached holding unit A at one end of the base 1, operative for holding one end of the snell, and a hook holding unit B, located at the opposite end of base 1 and operative for holding the hooks.

Figure 2:
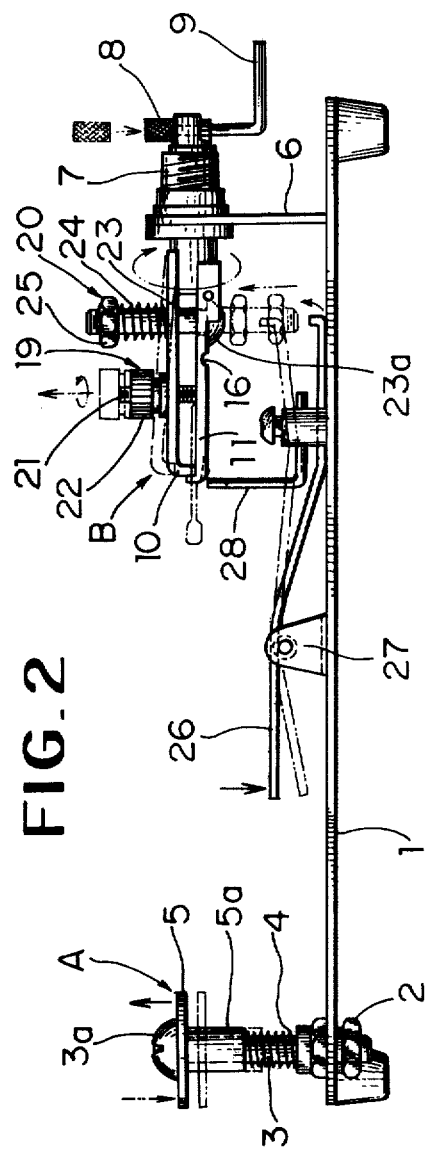
FIG. 2 is a side view of the device seen in FIG. 1.

Holding unit A, as shown in FIG. 2, is composed of a bolt 3 having a lower end secured to base 1 by a double nut 2, a spring 4 mounted on bolt 3, and a flange 5 having a body 5a as its lower end. The snell is held between the head 3a of bolt 3 and flange 5, which is pressed upward by spring 4 and which is able to move upward and downward in the direction shown by the arrows attached to the solid line and the broken line, respectively.

Hook holding unit B is pivoted on a supporting plate 6 that has its lower end fixed to base 1. Hook holding unit B can be rotated by turning a knob 9 which is attached to an end of pivot shaft 7 by means of a screw 8. Holding unit B is constructed as a nail nipper with an upper plate 10 and a lower plate 11. The lower plate 11 has a cutout 12 in the center of its tapered left end 13 (shown in FIG. 1). This end forms steps 14, 15 which guide the snell on either side of holding unit B. Plate 11 is provided with a groove 16 across its width near the center of the right side. The groove 16 is utilized in forming a coil about the hook as is pin 17 which is inserted through a hole 18 formed transversely through plate 11 near its rear edge as seen in FIG. 4.

Hook holding unit B is supplied with a hook securing nut 19 and a snell catching unit 20. The hook securing nut 19 is screwed onto a threaded rod 21 that is permanently affixed to plate 11 and passes through a hole in plate 10. Another nut 22 is screwed onto the rod 21 before nut 19 and serves to force plate 10 against plate 11. Nut 25 is screwed onto a threaded bolt 23 which passes through plate 10 and plate 11 against which the head 23a of bolt 23 is pressed by a spring 24 which is placed concentrically over the bolt 23 and held in place by nut 25. In this fashion snell catching unit 20 is formed so that head 32a of bolt 23 and lower plate 11 catch the snell due to the vertically reciprocating motion of bolt 23. The action of bolt 23 results from the activation by the user of lever 26 which has a pivot 27 between snell holding unit A and hook holding unit B. FIG. 2 also shows guide bars 28 secured to base 1 to limit the motion of the snell.

Figure 3:
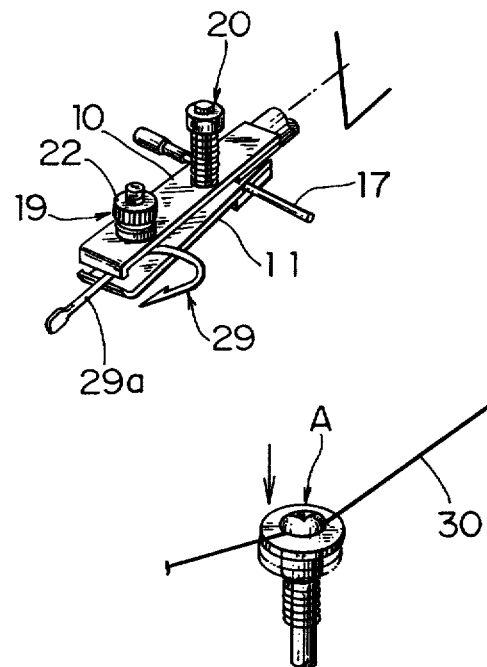
FIG. 3 is a perspective view of a detail of the device seen in FIG. 2.
Figure 4:
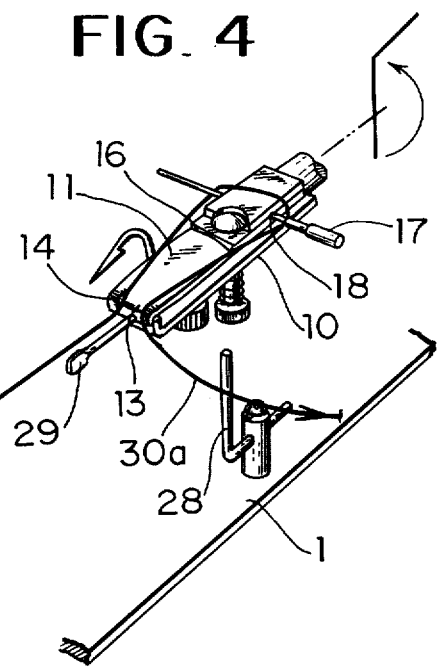
FIG. 4 is another perspective view of a detail of the device seen in FIG. 2 showing the initial stage of attaching the snell to the hook.
Figure 5:
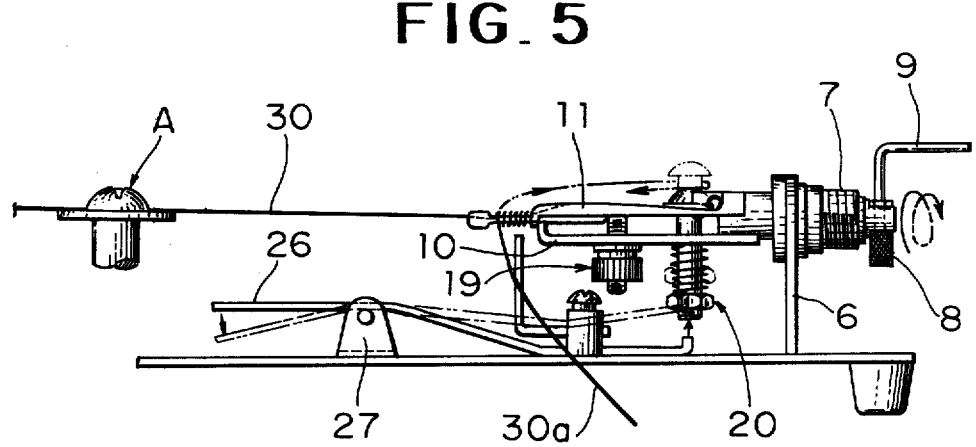
FIG. 5 is a side view of the device illustrating the coiling procedure.

FIGS. 3 through 7 illustrate the progressive completion of a coiled snell. In FIG. 3 the hook 29 has been admitted between upper plate 10 and lower plate 11 and screw 22 tightened to secure the hook 29 with its ends 29A positioned in cutout 12. In FIG. 4 end 30 of the snell has been caught by the holding unit A, and additionally held by step 14 after which the snell is wound about pin 17 which was placed in hole 18. The snell then is secured about step 15 and supported by hand against guide bar 28 under tension. As is shown in FIG. 5 the hook holding unit B is then rotated several times by the user turning knob 9. Simultaneously, the user pushes the end of lever 26 downward toward base 1 forcing bolt 23 upward whenever plate 11 has been rotated into an upward position and the end 30a of the snell is then wound over the head 23a of bolt 23. Subsequently snell 30a is cut at the mark x seen in FIG. 6. After snell 30 is released from the holding unit A, the snell 30 is pulled in the direction indicated by the arrow in FIG. 7 and bolt 23 is again raised by lever 26 as shown in FIG. 7. After end 30a of snell 30 is released, screw 22 is loosened to allow hook 29 to be removed from hook holding unit B yielding a properly coiled and secure snell as shown in FIG. 8. This procedure applies when an ordinary fish hook is being used. When a snell is attached for catching the Ayu fish, it is cut in advance and is held by snell catching unit 20 until the procedure is complete.

Further, the snell is not cut at mark x, but end 30a is passed through groove 16.

It will be understood that each of the elements described above, or two or more together, may also find a useful application in other types of snell coiling devices differing from the types described above.

While the invention has been illustrated and described as embodied in a snell coiling device it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for securing a snell about a fish hook, comprising a base; snell holding means for holding one end portion of the snell and mounted on one end side of said base; fish hook holding means mounted on another end side of said base and having a lower plate and an upper plate to receive a fish hook therebetween and connecting means for adjustably connecting said lower plate to said upper plate, said fish hook holding means including means for engaging and positioning another end portion of the snell and operative for securing said another end portion, said lower plate being formed with a hole, said fish hook holding means further including a detachable pin which is inserted through said hole and is operative for holding a loop of the snell and for releasing said loop when said pin is removed from said hole; and securing means for securing said another end portion of the snell about the fish hook held between said upper and lower plates.

2. A device as defined in claim 1, wherein said securing means comprises pivoting means operative for rotating said fish hook holding means.

3. A device as defined in claim 2, further comprising snell positioning release means which is operative to cause the release of the snell from the snell positioning means.

4. A device as defined in claim 3, wherein said snell positioning release means comprises a lever; and a fulcrum about which said lever pivots.

5. A device as defined in claim 1, wherein said snell holding means comprises a bolt having a head with an underside and a shaft; spring means; and a flange element biased by said spring means against said underside of said head of said bolt and operative for holding said snell between said flange element and said underside.

6. A device as defined in claim 1, wherein said means for engaging and positioning another end portion of the snell includes a recess and steps formed in said lower plate.

7. A device as defined in claim 6, wherein said engaging and positioning means further comprises a bolt with a head having an underside inserted through holes in the upper and lower plates, a stopping means operative for limiting the motion of said bolt, and spring means biasing said underside against said upper plate.

* * * * *